United States Patent

Hamada et al.

[11] Patent Number: 5,759,675
[45] Date of Patent: Jun. 2, 1998

[54] MULTI-LAYER STRETCHABLE, SHRINKABLE POLYETHYLENE FILM AND PROCESS FOR THE PREPARATION THEREOF

[75] Inventors: Kazuhiro Hamada; Osamu Saeki; Tooru Matsumoto; Hideo Isozaki, all of Yatsushiro, Japan

[73] Assignee: Kohjin Co., Ltd., Tokyo, Japan

[21] Appl. No.: 646,260

[22] PCT Filed: Sep. 18, 1995

[86] PCT No.: PCT/JP95/01841

§ 371 Date: May 17, 1996

§ 102(e) Date: May 17, 1996

[87] PCT Pub. No.: WO96/09166

PCT Pub. Date: Mar. 28, 1996

[30] Foreign Application Priority Data

Sep. 20, 1994 [JP] Japan ............ 6-250128
Feb. 27, 1995 [JP] Japan ............ 7-061558

[51] Int. Cl.⁶ .................... B32B 27/32; B65B 53/02
[52] U.S. Cl. .................... 428/213; 428/34.9; 428/35.2; 428/37.4; 428/515; 428/516; 428/173.11; 264/173.11; 264/173.14; 264/173.15; 264/173.16; 264/288.4
[58] Field of Search .................. 428/515, 516, 428/213, 34.9, 35.2, 34.7; 264/173.16, 173.11, 173.14, 173.15, 288.4

[56] References Cited

U.S. PATENT DOCUMENTS 4,801,652  1/1989  Mizutani et al. ............ 525/240
4,985,197  1/1991  Isozaki et al. ............ 264/564
5,407,732  4/1995  Dolurno ............ 428/213
5,635,286  6/1997  Morita et al. ............ 428/213

FOREIGN PATENT DOCUMENTS 3-215034  9/1991  Japan.
4-18347   1/1992  Japan.
5-131599  5/1993  Japan.

*Primary Examiner*—Paul J. Thibodeau
*Assistant Examiner*—D. Lawrence Tarazano
*Attorney, Agent, or Firm*—Armstrong, Westerman, Hattori, McLeland & Naughton

[57] ABSTRACT

A multi-layer film having an intermediate layer containing, as a main component, a mixture of two kinds of specific linear low density polyethylenes, and innermost and outermost layers containing, as a main component, a mixture of a specific high pressure process polyethylene, a specific ethylene-α-olefin copolymer and a specific linear low density polyethylene. The film has an automatic packaging machine applicability and an excellent heat sealability at low temperatures without defects such as lowering of tuck in property, stretchability in the transverse direction and film slipping property and blocking, and is suitably employed as films for stretch packaging and shrink packaging which are used for prepackaging of retailed goods, mainly foods. Further, a multi-layer film prepared by incorporating a specific surfactant composition into at least two layers of the above multi-layer film has, in addition to these properties, an excellent antifogging effect (initial antifogging property and retainability of antifogging property) on various objects to be packaged.

9 Claims, 1 Drawing Sheet

MULTI-LAYER STRETCHABLE, SHRINKABLE POLYETHYLENE FILM AND PROCESS FOR THE PREPARATION THEREOF

TECHNICAL FIELD

The present invention relates to a multi-layer stretchable, shrinkable polyethylene film and a process for the preparation thereof. More particularly, the present invention relates to a multi-layer stretchable, shrinkable polyethylene film which is particularly suitable as a stretch or shrink packaging film used for prepackaging of retailed articles, mainly foods, and which is excellent in applicability to automatic packaging machines and restoration from deformation.

BACKGROUND ART

In recent years, a demand for stretchable films for packaging foods such as meats, sea foods, vegetables, fruits and daily dishes is further increasing with the increase of the number and expansion of the scale of supermarkets and convenience stores. Heretofore, as the above-mentioned stretchable films, a film prepared from a plasticized polyvinyl chloride as a raw material has been most widely used, since the film has excellent properties such as transparency and self-tackiness. However, the film has the disadvantages that since a large amount of a plasticizer is used, steam permeates through the film in an increased amount to easily cause a weight loss or a deterioration of a packaged object, or the plasticizer is easy to migrate to the packaged object to contaminate it, and that harmful hydrogen chloride gas is generated during formation of the film, melt-cutting of the film in packaging work, destruction of the film by fire, and the like, thus a problem arises in safety, sanitary and environmental pollution.

Therefore, films which can be substituted for the plasticized polyvinyl chloride film have been actively developed using an ethylene resin such as polyethylene or ethylene-vinyl acetate copolymer, a polybutadiene resin, and the like. Although the polyethylene or polybutadiene resin films have no problem in safety, sanitary and environmental pollution, they are not fully satisfactory as a stretchable film.

For instance, a non-stretched low density polyethylene does not give beautiful packaging finish, since the film causes a necking phenomenon that only a part thereof elongates to result in marked unevenness in thickness, when the film is stretched for the purpose of stretch packaging, and since the restoration from deformation is small. Further, the film strength is poor and the transparency is unsatisfactory. So, in order to solve these problems, it has been attempted to provide the film with a high orientation by biaxial stretching. However, for example, a low density polyethylene has technical problems such that the film is broken during the processing. Thus, the obtained film has no effective molecular orientation and, therefore, is poor in strength. Also, the heat shrinkability is revealed only at high temperatures close to its melting point.

Also, there are proposed films composed mainly of crystalline 1,2-polybutadiene or ethylene-vinyl acetate copolymer to which an antifogging agent and a tackifier are added. However, these films have no heat shrinkability, and have the disadvantage that if packaging is attempted with these films, the breaking is easy to occur at the corner of a tray due to poor film strength.

Further, recently, with diversification of objects to be packaged and spread of automatic packaging machine, there have been demanded packaging materials having an applicability to automatic packaging machines, such as packaging materials capable of heat sealing and having, in addition thereto, a heat shrinkability.

In order to overcome the above-mentioned defects of the stretchable films and to meet these demands, the present inventors previously proposed a multi-layer stretchable, shrinkable polyethylene film having a heat shrinkability and a stretchability, and being capable of heat sealing by a plate heater, and giving good finished shrink packages such that the sealing joints did not peel off even if water adhered to the joints (Japanese Patent Publication Kokai No. 3-215034).

However, in the above-mentioned multi-layer stretchable, shrinkable polyethylene film, too, the stretchability in the transverse direction which is required depending on the kind of automatic packaging machines or required when packaging trays having less strength such as paper trays, the tuck in property or the heat sealability at low temperatures were not always satisfactory.

Also, a resin having a relatively low melting point has been generally used as a resin for improving the low temperature heat sealability. The effect of improvement in the low temperature heat sealability is seen in accordance with the amount of addition, but simultaneously there arise problems such as occurrence of blocking and lowering of the slipping property. Thus it has been difficult to satisfy both these conflicting properties.

Stretchable films for packaging foods are required to have a property of not causing fogging on its inner surface due to moisture vaporizing from packaged objects, that is, the so-called antifogging property. When packaging with films insufficient in the antifogging property, there occur problems such that the packaged objects cannot be recognized due to water droplets on the inner surface of the film and the market value of the packaged objects is lowered. The degree of the desired antifogging property varies greatly depending on the kind of objects to be packaged. For example, in case of meats, a high initial antifogging property is required for about three days after packaging, and in case of perishable vegetables such as a ginger and a champignon, a retainability of the antifogging property for about two weeks is required. However the above-mentioned multi-layer stretchable, shrinkable polyethylene film could not satisfy the requirement of the antifogging property for some kind of objects to be packaged.

Also, even if improvement of the antifogging property thereof can be achieved, there occur problems such that other properties required as a stretchable film or a stretchable and shrinkable film, e.g., transparency, gloss, tackiness, slipping property and the like, are lowered and the thickness variation increases, thus a difficulty may be encountered in obtaining a desired film.

DISCLOSURE OF THE INVENTION

The present inventors have made intensive studies to solve the above-mentioned problems. As a result, they have found that a multi-layer film having an intermediate layer comprising, as a main component, a mixture of two kinds of specific linear low density polyethylenes, and innermost and outermost layers comprising, as a main component, a mixture of a specific high pressure process polyethylene, a specific ethylene-α-olefin copolymer and a specific linear low density polyethylene, has an automatic packaging machine applicability excellent in heat sealability at low temperatures without defects such as lowering of tuck in property, stretchability in the transverse direction and the slipping property of the film and blocking, and have further found that a multi-layer film obtained by incorporating a specific surfactant composition into at least two layers of the above-mentioned multi-layer film has an excellent antifogging effect on various objects to be packaged in addition to the above-mentioned properties, thus the present invention has been accomplished.

That is, the present invention provides:

a multi-layer stretchable, shrinkable polyethylene film wherein an intermediate layer is made of a composition containing, as main components, (A) a linear low density polyethylene mentioned below and (D) a linear low density polyethylene mentioned below, and an innermost layer and an outermost layer which are made of a composition containing, as main components, (B) 15 to 50% by weight of a high pressure process polyethylene mentioned below, (C) 60 to 20% by weight of an ethylene-α-olefin copolymer mentioned below and (D) the linear low density polyethylene mentioned below, in which the maximum amount of the linear low density polyethylene (D) to be added to each layer is 30% by weight and the amount of the linear low density polyethylene (D) is from 10 to 30% by weight based on the whole layers, and the thickness of the intermediate layer is at least 60% of the total thickness of the whole layers and the thickness of each of the innermost layer and the outermost layer is at least 1 μm;

a multi-layer stretchable, shrinkable polyethylene film wherein a surfactant composition comprising the following surfactants (i), (ii), (iii) and (iv) is added to at least two layers in an amount of 0.5 to 4.0% by weight; and a process for preparing the multi-layer stretchable, shrinkable polyethylene film by carrying out melt-coextrusion so that the thickness of the intermediate layer is at least 60% of the total thickness of all layers and the thickness of each of the innermost layer and the outermost layer after a stretching treatment in the succeeding step is at least 1 μm, then solidifying by rapid cooling to give a non-stretched film, and stretching the non-stretched film in a temperature region capable of achieving orientation by stretching, under conditions such that a tensile strength S represented by the equation (1) is $40 \leq S \leq 130$ kg/cm², wherein:

(A) the linear low density polyethylene has a density of 0.915 to 0.935 g/cm³ and a melt index (hereinafter referred to as "MI") of 0.1 to 1.5 g/10 minutes, and shows, in measurement of a melting point by a differential scanning calorimeter (hereinafter referred to as "DSC"), a main peak temperature (melting point) within the range of not less than 121° C. and a heat of fusion within the range of 120 to 150 mJ/mg in a fusion curve obtained when the temperature is kept at 190° C. for 30 minutes, dropped down to 20° C. at a temperature dropping rate of 10° C./minute and subsequently raised at a temperature rising rate of 10° C./minute;

(B) the high pressure process polyethylene has a density of 0.917 to 0.935 g/cm³ and an MI of 0.3 to 7.0 g/10 minutes;

(C) the ethylene-α-olefin copolymer has a density of 0.870 to 0.900 g/cm³ and an MI of 0.1 to 20 g/10 minutes and shows, in measurement of a melting point by DSC, a main peak temperature (melting point) of 50° to 100° C. in a fusion curve obtained when the temperature is kept at 190° C. for 30 minutes, dropped down to 20° C. at a temperature dropping rate of 10° C./minute and subsequently raised at a temperature rising rate of 10° C./minute;

(D) the linear low density polyethylene has a density of 0.890 to 0.920 g/cm³ and an MI of 0.3 to 7.0 g/10 minutes, and shows, in measurement of a melting point by DSC, a main peak temperature (melting point) of not less than 112° C. and a heat of fusion of 75 to 130 mJ/mg in a fusion curve obtained when the temperature is kept at 190° C. for 30 minutes, dropped down to 20° C. at a temperature dropping rate of 10° C./minute and subsequently raised at a temperature rising rate of 10° C./minute; and wherein:

the surfactants (i), (ii), (iii) and (iv) are:
(i) one or more polyethylene glycol fatty acid esters,
(ii) one or more polyoxyethylene alkyl amines,
(iii) one or more polyoxyethylene alkyl ethers, and
(iv) one or more diglycerol fatty acid esters in which at least one ester has a melting point of not less than 25° C.; and wherein:
the equation (1) is:

$$S = pd/2t \qquad (1)$$

wherein p is an internal pressure of a bubble (kg/cm²), d is a diameter of the bubble (cm) and t is a film thickness (cm).

The above-mentioned measurement by the DSC was made in a nitrogen stream after weighing out 8 to 10 mg of a sample and sealing it in an aluminum pan. The peak top temperature (main peak temperature) and the heat of fusion were measured from a fusion curve obtained when the temperature was kept at 190° C. for 30 minutes, dropped down to 20° C. at a temperature dropping rate of 10° C./minute and subsequently raised at a temperature rising rate of 10° C./minute.

The linear low density polyethylene (A) used in the intermediate layer in the present invention has a density of 0.915 to 0.935 g/cm³ and an MI of 0.1 to 1.5 g/10 minutes. Also, in the measurement of melting point thereof by the DSC, the main peak temperature (melting point) in the fusion curve is not less than 121° C., and the heat of fusion is from 120 to 150 mJ/mg. Examples of the linear low density polyethylene (A) are copolymers of ethylene and one or more α-olefins having 3 to 20 carbon atoms, preferably 4 to 8 carbon atoms, including propylene, butene-1, hexene-1, 4-methyl-pentene-1, octene-1, decene-1 and dodecene-1. Preferred are a copolymer of ethylene and 4-methyl-pentene-1, a copolymer of ethylene and butene-1, a terpolymer of ethylene, 4-methyl-pentene-1 and butene-1 and a terpolymer of ethylene, octene-1 and butene-1.

If the density of the above-mentioned resin (A) is less than 0.915 g/cm³, there are defects that firmness of the film (especially in the machine direction) becomes too small, so the film does not run stably in an automatic packaging machine, thus resulting in tuck in failure. If the density is more than 0.935 g/cm³, the stretchability is lowered. The case where the MI is less than 0.1 g/10 minutes is not preferable from the viewpoint of lowering of the processability, and the case where the MI is more than 1.5 g/10 minutes is not preferable since the stretching stability in the stretching processing is lowered. Also, if the main peak temperature (melting point) in the DSC measurement is less than 121° C. or if the heat of fusion is less than 120 mJ/mg, the heat resistance of the films is lowered, so the upper limits of the temperature range suitable for heat sealing and the temperature range suitable for heat shrinking are lowered. If the heat of fusion is more than 150 mJ/mg, the tear strength and the uniform stretchability in the stretching processing are lowered.

The intermediate layer may contain, in addition to the linear low density polyethylenes (A) and (D), not more than 15 % by weight of other ethylene copolymer. Examples of such ethylene copolymers are, for instance, low melting point ethylene-α-olefin copolymers mentioned after, high pressure process polyethylenes, copolymers of ethylene and propylene, copolymers of ethylene and methacrylic acid, and copolymers of ethylene and acrylic acid.

When the amount of the above-mentioned other ethylene copolymer is more than 15 % by weight, the stretching stability on stretching under low tensile strength becomes unsatisfactory.

The high pressure process polyethylene (B) used in the innermost layer and the outermost layer in the present invention which has a density of 0.917 to 0.935 g/cm$^3$ and an MI of 0.3 to 7.0 g/10 minutes, is used as a low temperature heat sealability-imparting second component having a blocking inhibiting effect in combination with the aftermentioned ethylene-α-olefin copolymer (C) used as the first component for imparting a low temperature heat sealability. When the density of the resin (B) is less than 0.917 g/cm$^3$, the blocking inhibiting effect becomes small, so the slipping property and the roll releasability are deteriorated to interfere with the automatic packaging machine applicability. When the density is more than 0.935 g/cm$^3$, the tackiness is lowered, thus causing a tuck in failure. Also, if the MI is less than 0.3 g/10 minutes, the forming processability, transparency and gloss are deteriorated, and if the MI is more than 7.0 g/10 minutes, the transparency and gloss after heat shrink packaging tend to be lowered.

The ethylene-α-olefin copolymer which is used in the present invention as the first component for imparting the low temperature heat sealability, has a density of 0.870 to 0.900 g/cm$^3$ and an MI of 0.1 to 20 g/10 minutes, and shows, in the measurement of melting point by the DSC, a main peak temperature (melting point) of 50° to 100° C. in the fusion curve. Examples of the ethylene-α-olefin copolymer are, for instance, copolymers of ethylene and propylene, butene-1, pentene-1, hexene-1, 4-methyl-pentene-1, octene-1, decene-1 or a mixture thereof. In particular, a copolymer of ethylene and butene-1 is preferably used.

If the resin (C) has a density of less than 0.870 g/cm$^3$, the low temperature heat sealability is good, but blocking of films is easy to occur even if the surfactant composition is added. The resin (C) having a density of more than 0.900 g/cm$^3$ is not preferable because the low temperature heat sealability is lowered. The resin (C) having an MI of less than 0.1 g/10 minutes is not preferable from the viewpoints of lowering of the processability and lowering of the stretchability, like the case of the linear low density polyethylene. The resin (C) having an MI of more than 20 g/10 minutes has a problem that the stability of the stretched tube becomes bad.

In the present invention, the linear low density polyethylene (D) is added to each layer for the purpose of imparting a stretchability in the transverse direction. In case where it is added to the innermost layer and the outermost layer, some of the polyethylenes (D) exhibit an effect as the second component for imparting the low temperature heat sealability, but since the polyethylene (D) is easy to cause blocking, it must be used in combination with the above-mentioned resin (B). As the linear low density polyethylene (D), there are exemplified, for instance, copolymers of ethylene and one or more of α-olefins having 3 to 20 carbon atoms, preferably 4 to 8 carbon atoms, such as propylene, butene-1, hexene-1, 4-methyl-pentene- 1, octene-1, decene-1 and dodecene-1.

The density of the above-mentioned resin (D) is within the range of 0.890 to 0.920 g/cm$^3$, preferably 0.895 to 0.915 g/cm$^3$. When the density is less than 0.890 g/cm$^3$, firmness of films is small, and when the density is more than 0.920 g/cm$^3$, there is no effect of improving the stretchability in the transverse direction. Also the MI is within the range of 0.3 to 7.0 g/10 minutes, preferably 1.0 to 5.0 g/10 minutes. When the MI is less than 0.3 g/10 minutes, the effect of improving the stretchability in the transverse direction becomes small, and when it is more than 7.0 g/10 minutes, it is not preferable because the stability in stretching a tube tends to be lowered, though the effect of improving the stretchability does not change. If the main peak temperature in the measurement by the DSC is less than 112° C. or if the heat of fusion is less than 75 mJ/mg, the heat resistance of films is lowered particularly when such a resin is added to the intermediate layer. If the heat of fusion is more than 130 mJ/mg, it is not preferable because of no effect of improving stretchability in the transverse direction.

The proportion of the linear low density polyethylene (D) to be added to each layer in the present invention is from 10 to 30% by weight based on the whole layers. If the proportion is less than 10% by weight, the effect of giving the stretchability in the transverse direction is small, thus undesirable. On the other hand, if the proportion is more than 30% by weight, the heat resistance of films and the firmness of films in the machine direction are lowered.

The proportion of the high pressure process polyethylene (B) to be added to the innermost layer and the outermost layer is from 15 to 50% by weight. If the proportion is less than 15% by weight, low temperature heat sealability and antiblocking effect are not seen, and if the proportion is more than 50% by weight, the tackiness is lowered.

Also, the proportion of the ethylene-α-olefin copolymer (C) to be added to the innermost and the outermost layers in the present invention is from 60 to 20% by weight. If it is less than 20% by weight, the low temperature heat sealability is poor, so the heat sealability at a tray bottom by a plate heater of an automatic packaging machine is deteriorated. Also, the tackiness is lowered, so tube forming utilizing the tackiness is not successfully carried out in an automatic packaging machine. On the other hand, if it is more than 60% by weight, the low temperature heat sealability and the stretchability are good, but performances simultaneously satisfying the roll-releasability at the time of taking out of film rolls, the slipping property in automatic packaging machines and the tackiness between films cannot be obtained even in a case of adding the surfactant composition.

In the present invention, when the thickness of the intermediate layer is less than 60% of the total thickness of the whole layers, the stability of a bubble at the time of stretching is deteriorated, and when the thickness of each of the innermost layer and the outermost layer after stretching is less than 1 μm, the heat sealability at low temperatures cannot be exhibited, thus in the both cases, the objects of the present invention cannot be achieved.

In the present invention, the film may contain one or more layers of a polyethylene resin between the intermediate layer and the innermost layer or the outermost layer so long as the thickness limitations for each layer, that is, the conditions that the thickness of the intermediate layer is at least 60% of the thickness of the entire and the thickness of each of the innermost layer and the outermost layer after stretching is at least 1 μm are satisfied. Examples of the polyethylene resin capable of constituting such layers are, for instance, widely used linear low density polyethylene resins, ethylene-α-olefin copolymers, high pressure process polyethylenes, copolymers of ethylene and propylene, ionomers, ethylene-vinyl acetate copolymers, copolymers of ethylene and methacrylic acid, copolymers of ethylene and acrylic acid, and the like.

In the present invention, an excellent antifogging effect to various objects to be packaged can be produced by further incorporating a surfactant composition into at least two layers. It is preferable to add such a composition to all layers from the viewpoint that the antifogging effect is stably exhibited immediately after the manufacturing for a long term.

The required level of the antifogging property varies depending on the kind of materials to be packed. For example, for meats (for cold storage), a more effective initial antifogging property, particularly an immediate effect functioning in several hours after packaging, is required as compared with other foods. For perishable vegetables such as ginger and champignon, which are displayed in stores for a long term, a retainability of the antifogging property capable of maintaining its effect longer is required. In order to attain an excellent antifogging property for these foods without causing problems of lowering other properties required for stretchable, shrinkable films, e.g., transparency, gloss, tackiness and slipping property, and a problem of increasing variation in thickness, there is particularly preferred a surfactant composition comprising (i) one or more of polyethylene glycol fatty acid esters, (ii) one or more of polyoxyethylene alkyl amines, (iii) one or more of polyoxyethylene alkyl ethers and (iv) one or more of glycerol fatty acid esters wherein at least one of them has a melting point of not less than 25° C.

The polyethylene glycol fatty acid esters (i) used in the present invention can be those having fatty acid groups whose main component is any of fatty acid groups having 8 to 22 carbon atoms, and which may have unsaturated bonds. Among them, polyethylene glycol oleate, polyethylene glycol laurate and the like are preferable from the viewpoints of variation in thickness, acceleration of bleeding of the surfactant, slipping property and transparency. The molecular weight of the polyethylene glycol moiety is not specifically limited, but is preferably not more than 600 from the viewpoints of slipping property, transparency and antifogging property.

The polyoxyethylene alkylamines (ii) can be those having fatty acid groups whose main component is any of fatty acid groups having 8 to 22 carbon atoms and which may have unsaturated bonds. Among them, polyoxyethylene oleylamine and polyoxyethylene laurylamine are preferable from the viewpoints of acceleration of bleeding of the surfactant, gloss and tackiness.

The polyoxyethylene alkyl ethers (iii) can be those having fatty acid groups whose main component is any of fatty acid groups having 8 to 22 carbon atoms and which may have unsaturated bonds. Among them, polyoxyethylene oleyl ether, polyoxyethylene stearyl ether, polyoxyethylene lauryl ether and the like are preferable from the viewpoints of quickly acting property and initial antifogging property.

The diglycerol fatty acid esters (iv) can be those having fatty acid groups whose main component is any of fatty acid groups having 8 to 22 carbon atoms and which may have unsaturated bonds. This component is added to impart initial antifogging property and tackiness. In case that a retainability of antifogging property is particularly required, at least one diglycerol fatty acid ester having a melting point of not less than 25° C. is used as the component (iv). Examples of the diglycerol fatty acid esters used in the present invention are, for instance, diglycerol oleate, diglycerol stearate, diglycerol palmitate, diglycerol myristate, diglycerol laurate, diglycerol beef tallow fatty acid ester, and the like.

The amount of addition of the surfactant composition comprising the surfactants (i), (ii), (iii) and (iv) is from 0.5 to 4.0% by weight. If the amount is less than 0.5% by weight, the antifogging property is not exhibited and the slipping property of the film is poor. Even if the amount exceeds 4.0% by weight, no increase of the antifogging property is seen, thus undesirable from the viewpoint of cost.

The mixing ratio of the surfactants (i), (ii), (iii) and (iv) in the surfactant composition is preferably (i):(ii):(iii):(iv)=1 to 5:1.5 to 8:1:1 to 10 from the viewpoints of simultaneously satisfying antifogging property and properties such as transparency, gloss, tackiness and slipping property.

In addition to the above-mentioned surfactants, other surfactants can be added within the range not impairing the antifogging property for the purpose of further enhancing film tackiness, slipping property and gloss. As such surfactants, there are exemplified sorbitan oleate, sorbitan trioleate, sorbitan oleate, oleic acid diethanol amide, sucrose fatty acid esters and the like.

In addition to the above-mentioned components, additives usually used, such as a lubricant, an antiblocking agent and an antistatic agent, may be suitably added to each layer in proper amounts for the purpose of imparting, in cooperation with resin compositions, a releasability of films from rolls, a slipping property to automatic packaging machines and a slipping property for enhancing efficiency of packaging and packing works and for the purpose of providing the respective useful functions.

A process for the preparation of a non-stretched film used in the preparation of the stretched film of the present invention and a process of the preparation of the stretched film by stretching the non-stretched film can be carried out in known manners. However, it is necessary to conduct the stretching under the condition that the tensile strength S is $40 \leq S \leq 130$ kg/cm$^2$. Concrete conditions are explained below with reference to the case of forming a three-layered tubular film composed of the intermediate layer, the innermost layer and the outermost layer and stretching it.

Firstly, the above-mentioned specific resin compositions for the respective layers are melt-kneaded in three extruders, coextruded in a tubular form through a three-layered circular die, and once solidified by rapid cooling without stretching to give a non-stretched film.

The thus obtained tubular non-stretched film is fed to a tubular stretching apparatus, for example, as shown in FIG. 1, and is subjected to a simultaneous biaxial stretching by inflation stretching within a temperature range capable of achieving orientation, for example, at a temperature lower than the melting point of the intermediate layer resin by at least 10° C., preferably at least 15° C., applying a gas pressure to the inside of the tube. In that case, it is necessary that the tensile strength S is controlled so as to be $40 \leq S \leq 130$ kg/cm$^2$.

If the tensile strength S is less than 40 kg/cm$^2$, firmness of the film in the machine direction is lowered to deteriorate the tuck in property, though the stretchability in the transverse direction is good. Also the restoration from deformation of the obtained film is lowered to deteriorate the restoration property after shrink packaging which is one of the features of the present invention, as well as tendency to lower the stability of the stretched bubble. If the tensile strength S is more than 130 kg/cm$^2$, the obtained film is excellent in heat shrinkability, but the tensile stress at 50% elongation in the transverse direction is increased and the elongation is also decreased, thus it is not possible to achieve an improvement of the stretchability in the transverse direction, which is an object of the present invention.

It is preferable that the stretching ratios are on the same levels in both the machine and transverse directions in order to obtain well balanced physical properties such as strength. In exhibiting more effectively the firmness in the machine direction and stretchability in the transverse direction of the obtained stretched film, it is better to make the stretching ratio in the machine direction somewhat higher. It is preferable that the stretching ratio is from 8 to 25 times in terms of the area ratio.

The film prepared by the method of the present invention has a tensile stress of not more than 400 kg/cm² in the transverse direction at 50% elongation and has an area shrinkage at 90° C. of not less than 20%. Furthermore, the elastic restoration one minute after 30% elongation of the film heat-shrinked so as to get an area shrinkage of 15% at 90° C. is at least 90%.

The film stretched and taken out of a stretching equipment, as mentioned above, can be annealed if necessary, and can be subjected to corona discharge in order to facilitate bleeding of the antifogging agent.

BEST MODE FOR CARRYING OUT THE INVENTION

Figure 1:
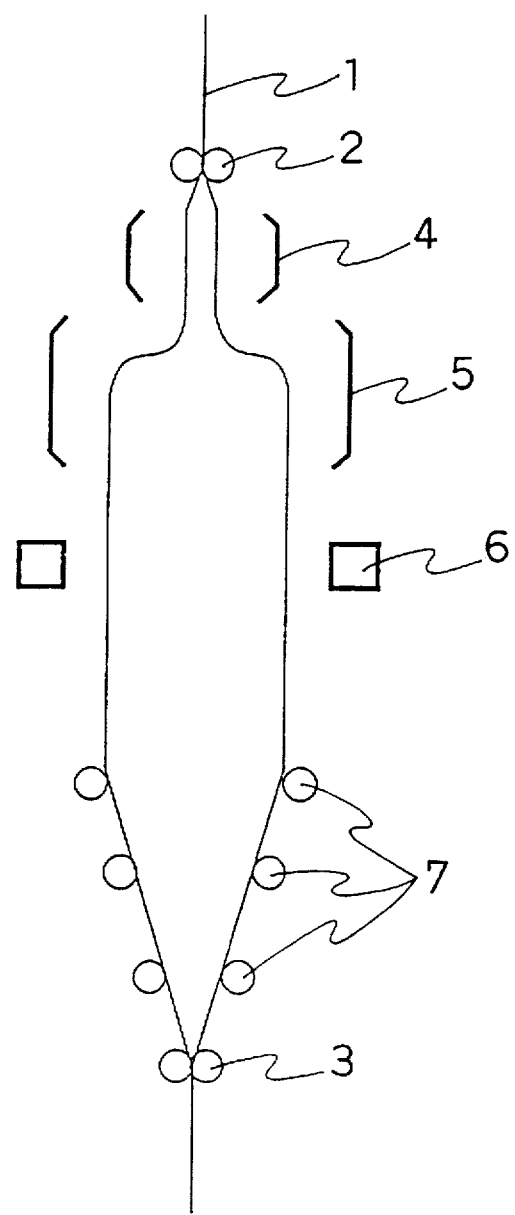
FIG. 1 is a section view illustrating a biaxial stretching apparatus used in Examples wherein 1 is a non-stretched film, 2 is low-speed nip rolls, 3 is high-speed nip rolls, 4 is a preheater, 5 is a main heater, 6 is a cooling air ring, and 7 is collapser rolls.

The present invention is more specifically explained by means of the following Examples.

The measurements of the physical properties shown in the Examples were made by the following methods.

(1) Heat shrinkage at 90° C.

A film cut in a square of 10 cm by 10 cm was covered with a talc powder, allowed to stand in an oven maintained at 90° C. for 15 minutes. After the film was taken out and rapidly cooled, the lengths in the machine and transverse directions were measured and the heat shrinkage was calculated according to the equation (2):

$$\text{Heat shrinkage at 90° C.} = 100 - A \times B (\%) \qquad (2)$$

wherein A and B represent the lengths (cm) in the machine and transverse directions after rapid cooling, respectively.

(2) Elastic Restoration After 15% Shrinkage

A film was fixed in a wooden frame in a uniformly slacken state so that the area shrinkage would become 15%, and it was heat-treated in an oven at 90° C. until the slackening of the film disappeared and was taken out of the oven.

A specimen was then cut out parallel to MD and TD of the film in a width of 15 mm and a length of 200 mm, respectively, and two lines were marked on the specimen at 100 mm spacing. The specimen was attached to a tensile tester (spacing between chucks 150 mm) so that the two marked lines were set between the chucks, and was elongated by 30% at a rate of tension of 200 mm/minute and returned to the original chuck position at the same rate as above. The film was detached from the tester and was allowed to stand for 1 minute. The length between the two marked lines was then measured, and the restoration of the film was calculated according to the following equation (3):

Elastic restoration after 15% shrinkage $$= \{(130 - C)/30\} \times 100 \ (\%) \qquad (3)$$

wherein C is a length between the two marked lines (mm) in the machine or transverse direction after 1 minute.

(3) Applicability to automatic packaging machine (tuck in property)

Two apples having a height of about 10 cm were put on a tray made of a foamed polystyrene and having a width of 105 mm, a length of 195 mm and a depth of 20 mm, and a packaging test was conducted by using a commercially available automatic packaging machine provided with a plate heater for sealing and a tunnel for shrinking. The packaging machine applicability was estimated according to the following criteria:

○: Running of the film is stable and states of a tuck in and sealing at the tray bottom are good, thus a tightly-fitting fine finished package is obtained by heat shrinkage.

Δ: Tuck in state is not so good, bottom sealing is insufficient, thus a finished package is poor in feeling of tightness.

X: Roll sending and running of the film are not stable and the portion tucked in is turned over, thus packaging is not possible.

(4) Applicability to Automatic Packaging Machine (Heat Sealability)

The temperature of the plate heater for sealing was raised under the same conditions as in the above (3) except that the objects to be packaged were changed to two oranges having a diameter of about 5 cm so as to achieve a good tuck in. The plate heater sealing temperature (heat seal initiating temperature) at which the film starts to fuse together so enough that the tray bottom is broken if the film is forcedly peeled off, and the temperature (heat resisting temperature) at which a hole is made in the tray bottom were measured.

(5) Applicability to automatic packaging machine (stretchability)

Two croquettes having a height of 25 mm were put on a tray made of a foamed polystyrene and having a width of 125 mm, a length of 180 mm and a depth of 33 mm and a packaging test was conducted by using a commercially available push-up type automatic packaging machine provided with a plate heater for sealing and a tunnel for shrinking.

Deformation of the tray at the time of packaging was estimated according to the following criteria:

○: There is no trouble such as breakage or deformation of the tray at the time of pushing it up (when the object to be wrapped is wrapped with stretching the film), and a fine finished package is obtained.

X: The tray deforms or breaks at the time of pushing it up.

(6) Restoration after packaging

A tray with a depth of 12 mm having no contents was packaged by using the same automatic packaging machine as used in (3) under the same conditions as in test (3). The film at the center portion of the tray was pushed with a finger until the finger touched the bottom of the tray and then the finger was released from the film. The time required for the film to return to the former state was measured. The estimation was made according to the following criteria.

○: Within 10 seconds
Δ: Within 1 minute
X: A finger mark remains on the film for more than 1 minute, or the film cannot return to its former state.

(7) Antifogging Property A

After 50 ml of water of 60° C. was poured into a 100 ml beaker, the opening of the beaker was covered with the film in the state of no creases. The beaker was allowed to stand in a refrigerator maintained at 5° C. for 1 hour, and the film was observed and evaluated according to the following criteria.

◯: Not entirely clouded.

Δ: Although water droplets adhere partly to the film, the inside of the beaker can be seen through the film.

X: The entire surface of the film is clouded and the inside of the beaker cannot be seen through the film.

(8) Antifogging Property B

Each of pork ribs (for cold storage) 150 g, beef ribs (for cold storage) 150 g, ginger (for cold storage) 250 g and champignon (for cold storage) 150 g was put in trays made of a foamed polystyrene and having a length of 20 cm, a width of 10 cm and a depth of 1.8 cm, and after packaging using a commercially available stretch-shrink automatic packaging machine, the packaged pork ribs and beef ribs were stored in a 5 atmosphere in an open display case, and the packaged ginger and champignon were stored in a 10° C. atmosphere in an open display case. The inner surfaces of the films were observed and estimated with a lapse of time. The estimation was made according to the following criteria.

⊚: Water is scarcely seen on the inner surface of the film, so the content can be recognized clearly.

◯: Although a thin water film is seen on the inner surface of the film, the content can be recognized clearly.

Δ: A thick water film in the form of scale is seen on the inner surface of the film, so the content is seen dimly.

X: Small water droplets are seen on the inner surface of the film, so the content cannot be recognized.

(9) Thickness of Each Layer

The thickness of each layer of a multi-layer film was measured by observing the cross section of the film with a microscope and reading the thickness.

(10) Haze after packaging

A haze value was measured with respect to the packaged objects obtained in the above (3).

(11) Gloss after packaging

A gloss value was measured with respect to the packaged objects obtained in the above (3).

EXAMPLE 1

There were used a composition consisting of 70% by weight of a linear low density polyethylene (A), 25% by weight of a linear low density polyethylene (D) and 5% by weight of an ethylene-α-olefin copolymer (C), which had characteristics shown in Table 1, as the intermediate layer, and compositions consisting of 25% by weight of a high pressure process polyethylene (B), 50% by weight of the ethylene-α-olefin copolymer (C) and 25% by weight of the linear low density polyethylene (D), which had characteristics shown in Table 1, as the innermost and outermost layers. To each of these compositions of each layer was added 1.0 part by weight of a surfactant composition consisting of 0.25 part by weight of polyethylene glycol oleate, 0.40 part by weight of oleyl diethanolamine and 0.35 part by weight of sorbitan trioleate. The obtained compositions for the intermediate layer, the innermost layer and the outermost layer were melt-kneaded at a temperature of 170° to 240° C. respectively in three extruders (for the intermediate layer, for the innermost layer and for the outermost layer). The extrusion outputs from the respective extruders were adjusted under the estimation of the thickness ratio shown in Table 1, and they were extruded downward from a three-layer circular die kept at 240° C. The diameter of the slit of the circular die was 75 mm and the gap of the slit was 0.8 mm. The extruded three-layer tubular molten film was cooled by sliding its inner side on the outer surface of a cylindrical cooling mandrel which was disposed just below the die and had an outer diameter of 76 mm and in which a 20° C. cooling water was circulated, and by passing the outer side through a water bath to water-cool the film to room temperature, and drawn to give a tubular non-stretched film having a diameter of about 75 mm and a thickness of 240 µm.

This tubular non-stretched film was guided to a tubular biaxial stretching device illustrated in FIG. 1 to carry out the inflation stretching. At that time, the voltage and current of circular infrared heaters of preheater 4 were adjusted so as to adjust the film temperature at the exit of the preheater. Eight circular infrared heaters of main heater 5 were grouped in 4 sections and the voltage and current of each section were adjusted, whereby the film was heated. While an air stream was supplied along the tube downwardly from the main heater, a pressurized air was blown into the tubular film between low-speed nip rolls 2 and high-speed nip rolls 3. The pressure of the pressurized air and the relative peripheral speeds of the low-speed and high-speed nip rolls 2 and 3 were controlled so as to effect the tubular stretching in a stretching ratio of 5.0 in the machine direction and in a stretching ratio of 4.0 in the transverse direction (area stretching ratio: 20). Also, the air pressure (inner pressure of the tube) at the time of stretching was adjusted so as to obtain a tensile strength of 70 kg/cm$^2$ by controlling the voltage and current of the circular infrared heaters of the preheater and the main heater and further the air quantity and the air temperature of the cooling air ring 6.

The stability during the stretching was good, and vertical motion of the stretching point and swaying of the stretched tube did not occur. Also, a nonuniform stretching state such as necking was not observed.

The obtained film was, as shown in Table 2, excellent in transparency, gloss, firmness of film in the machine direction, stretchability in the transverse direction, heat shrinkability, elastic restoration and antifogging property. In a test of packaging two bulky apples in a tray with the obtained film by a pillow type automatic packaging machine, good tuck in was made. Also, in the measurement of the heat seal initiating temperature and the upper limit (heat resisting temperature) of the heat seal temperature by tray packaging of two oranges which had such a height as relatively easily making a tuck in, both the low temperature heat sealability and the heat resistance were good, so a wide temperature range suitable for heat sealing was obtained. These packaged goods were good in shrink in the tunnel, so there was no crease and no looseness and it showed fine finish. As to the restoration after packaging, the film returned to the former state in 2to 3seconds without a finger mark remaining. Further, in a test for packaging in a somewhat deep tray using a push-up type automatic packaging machine, wrapping with a film was made smoothly without deformation and breakage of the tray at the time of pushing up, so a fine finished package was obtained.

The raw materials, the stretching conditions, the stretched film characteristics and the results obtained in each test are shown in Tables 1 and 2.

EXAMPLES 2 TO 6

Stretchable, shrinkable laminate films were prepared in the same manner as in Example 1 except that the constituent resins and the proportions thereof for the intermediate layer and the innermost and outermost layers, the setting of thickness proportions of the respective layers and the tensile strength at the time of stretching were changed as shown in Tables 1 and 2.

The obtained films were estimated in the same manner as in Example 1. All of the films were excellent in transparency, gloss, firmness of film in the machine direction, stretchability in the transverse direction, heat shrinkability, elastic restoration, antifogging property and heat sealability. Also, the packaging machine applicability with respect to automatic packaging machine and packaging conditions was excellent, and the appearance of finished package was fine.

The results of the respective tests and estimations are shown in Table 2.

COMPARATIVE EXAMPLE 1

A multi-layer stretchable, shrinkable film was prepared in the same manner as in Example 1 except that a resin (D) having a density and a heat of fusion which were out of the scope of the claims was used, as shown in Tables 3 and 4. The physical properties and the packaging machine applicability were evaluated.

The obtained film was insufficient in stretchability in the transverse direction, and in the test using the push-up type automatic packaging machine, there occurred deformation and breakage of the tray.

COMPARATIVE EXAMPLES 2 AND 3

Multi-layer stretchable, shrinkable films were prepared in the same manner as in Example 1 except that the resin (D) was used in concentrations of 5% by weight for the respective layers in Comparative Example 2, and the resin (D) was used in concentrations of 40% by weight for the intermediate layer and 30% by weight for the innermost and outermost layers in Comparative Example 3 as shown in Tables 3 and 4. The physical properties and the packaging machine applicability were evaluated.

The film obtained in Comparative Example 2 was insufficient in stretchability in the transverse direction, and in the test using the push-up type automatic packaging machine, there occurred deformation and breakage of the tray. The film obtained in Comparative Example 3 was poor in modulus of tensile elasticity in the machine direction, and in the test for packaging bulky objects by the pillow type automatic packaging machine, the tuck in portion almost turned over, thus packaging was impossible. Even if a tuck in could be made, the film was poor in heat resistance and the temperature range suitable for heat sealing on a high temperature side was narrow.

COMPARATIVE EXAMPLE 4

A multi-layer stretchable, shrinkable film was prepared in the same manner as in Example 1 except that the proportion of the resin (B) used in the innermost and outermost layers was changed to 10% by weight as shown in Tables 3 and 4. The physical properties and the packaging machine applicability were evaluated.

In the test for packaging bulky objects by the pillow type automatic packaging machine, the obtained film showed somewhat unstable running, the tuck in portion was not fine, and due to non-uniform overlapping of the film, heat sealing by the plate heater could not be made sufficiently. Also even if the film could be tucked in satisfactorily, the heat seal initiating temperature was somewhat high and the temperature range for proper heat sealing on a low temperature side became narrow.

COMPARATIVE EXAMPLE 5

A multi-layer stretchable, shrinkable film was prepared in the same manner as in Example 1 except that the tensile strength S at the time of stretching was 150 kg/cm$^2$ as shown in Tables 5 and 6. The physical properties and the packaging machine applicability were evaluated.

The obtained film was insufficient in stretchability in the transverse direction, and in the test using the push-up type automatic packaging machine, there occurred deformation and breakage of the tray.

COMPARATIVE EXAMPLES 6 AND 7

Multi-layer stretchable, shrinkable films were prepared in the same manner as in Example 1 except that the constituent resins and the proportions thereof for the intermediate layer, the resin (B) and the proportions thereof for the innermost and outermost layers, and the setting of thickness proportions were changed as shown in Tables 5 and 6. The physical properties and the packaging machine applicability were evaluated.

In the test for packaging bulky objects by using the pillow type automatic packaging machine, the film obtained in Comparative Example 6 showed somewhat unstable running, the tuck in portion was not so good, and the heat sealing could not be made sufficiently. Also even if a tuck in could be made properly, the heat seal initiating temperature was high, so the temperature range suitable for heat sealing on a low temperature side was narrow.

The film obtained in Comparative Example 7 was low in modulus of tensile elasticity in the machine direction, most of the tuck in portion turned over, thus packaging was impossible. Even if tuck in could be made, the heat seal initiating temperature was high and the heat resisting temperature was also low, so the temperature range suitable for heat sealing was narrow.

EXAMPLE 7

A multi-layer stretchable, shrinkable film was prepared in the same manner as in Example 1 by using the compositions for the intermediate layer, the innermost layer and the outermost layer containing the constituent resins having the characteristics shown in Tables 7 and 8 and the surfactant compositions shown therein. The automatic packaging machine applicability, physical properties and antifogging property were evaluated.

As shown in Table 9, in a test for packaging two bulky apples in a tray with the obtained film by a pillow type automatic packaging machine, good tuck in was obtained, and heat sealing at a tray bottom was also made sufficiently. The shrinkage in the tunnel was good, and the finished package had no crease and no looseness and was fine. Thus, the automatic packaging machine applicability was good. Also, the transparency and gloss of the film after packaging were good and the finished package had a good appearance. Further, when the surface of the packaged goods is pushed with a finger, the film returned to the former state in 2 to 3 seconds without a finger mark remaining, so the restoration from deformation was also good.

The antifogging property was examined by using this film and packaging meats (pork ribs and beef ribs) and vegetables (ginger and champignon). The initial antifogging property and the retainability of the antifogging property were good and fogging due to water droplets was not observed at all.

The raw materials, the stretching conditions, the film properties after stretching and the results obtained in each test are shown in Tables 7, 8 and 9.

EXAMPLES 8 TO 11

Multi-layer stretchable, shrinkable films were prepared in the same manner as in Example 1 except that the constituent resins for the intermediate layer and the innermost and outermost layers, the surfactant composition, the proportions and the amount of addition thereof, the setting of thickness proportions of the respective layers and the tensile strength at the time of stretching were changed as shown in Tables 7 and 8. The automatic packaging machine applicability, physical properties and antifogging property were evaluated.

In all Examples 8 to 11, the stability during the stretching was good and vertical motion of the stretching point and swaying of the stretched tube did not occur. Also, any nonuniform stretching state such as necking was not observed.

The obtained films were evaluated in the same manner as in Example 7. All films had a good automatic packaging machine applicability, and showed a fine finish excellent in transparency and gloss and a good restoration from deformation. Also the initial antifogging property and the retainability of the antifogging property were excellent, and there was not seen fogging on the inner surface of the film.

The results of each test and the evaluation thereof are shown in Table 9.

COMPARATIVE EXAMPLE 8

A multi-layer stretchable, shrinkable film was prepared in the same manner as in Example 1 except that the composition of the surfactants was changed as shown in Tables 10 and 11, and the automatic packaging machine applicability, physical properties and antifogging property were evaluated.

As shown in Table 12, the obtained film had a good automatic packaging machine applicability, were excellent in transparency and gloss, and gave a fine finish having no crease and no looseness. However, when meats were packaged, water droplets adhered to the inner surface of the film and there was a case where the content cannot be recognized. A good antifogging property was exhibited with respect to gingers and champignons.

COMPARATIVE EXAMPLE 9

A multi-layer stretchable, shrinkable film was prepared in the same manner as in Example 1 except that the compositions of the surfactants and the amount of addition were changed as shown in Tables 10 and 11, and the automatic packaging machine applicability, physical properties and antifogging property were evaluated.

As shown in Table 12, the obtained film has a good automatic packaging machine applicability, was excellent in transparency and gloss, and gave a fine finish having no crease and no looseness. The antifogging property for meats was good up to two days after packaging. For gingers and champignons, water droplets began to adhere to the inner surface of the film three or four days after packaging, and amounted to such an extent as not to recognize the content.

INDUSTRIAL APPLICABILITY

As explained above, the multi-layer stretchable, shrinkable polyethylene films of the present invention are excellent in all of transparency, heat shrinkability, elastic restoration, tensile elasticity in the machine direction, stretchability in the transverse direction and heat sealability, and further, the films into which a specific surfactant composition has been incorporated are excellent also in antifogging property (initial antifogging property and retainability of antifogging property) to various objects to be packaged, and are particularly suitable as the films for stretch packaging and shrink packaging which are used for prepackaging of retailed articles, mainly foods.

TABLE 1

|  | EX. 1 | EX. 2 | EX. 3 | EX. 4 | EX. 5 | EX. 6 |
| --- | --- | --- | --- | --- | --- | --- |
| Intermediate layer |  |  |  |  |  |  |
| Resin A |  |  |  |  |  |  |
| Density (g/cm$^3$) | 0.920 | " | " | 0.930 | 0.916 | " |
| MI (g/10 min.) | 0.5 | " | " | 1.3 | 1.2 | " |
| Comonomer | 4-methyl-pentene-1 | " | " | 4-methyl-pentene-1 | 4-methyl-pentene-1, butene-1 | " |
| Melting point (°C.) | 124 | " | " | 125 | 124 | " |
| Heat of fusion (mJ/mg) | 143 | " | " | 139 | 129 | " |
| Resin D |  |  |  |  |  |  |
| Density (g/cm$^3$) | 0.910 | 0.919 | 0.916 | 0.910 | " | the |
| MI (g/10 min.) | 3.0 | 1.0 | 1.2 | 3.0 | " | same |
| Melting point (°C.) | 115 | 121 | 124 | 115 | " | as |
| Heat of fusion (mJ/mg) | 90 | 116 | 129 | 90 | " | resin A |
| Resin C |  |  |  |  |  |  |
| (the same as right) | Resin C of innermost layer and outermost layer | Resin C of innermost layer and outermost layer | — | Resin C of innermost layer and outermost layer | — | Resin C of innermost layer and outermost layer |
| A/D/C weight ratio | 70/25/5 | 70/25/5 | 75/25/0 | 75/20/5 | 85/15/0 | 90/0/10 |
| Setting of thickness proportion (%) | 70 | 75 | 80 | 65 | 80 | 80 |

TABLE 1-continued

|  | EX. 1 | EX. 2 | EX. 3 | EX. 4 | EX. 5 | EX. 6 |
|---|---|---|---|---|---|---|
| Innermost and outermost layers | | | | | | |
| Resin B | | | | | | |
| Density (g/cm$^3$) | 0.922 | 0.928 | 0.922 | 0.922 | 0.928 | " |
| MI (g/10 min.) | 3.0 | 3.0 | 5.0 | 3.0 | 3.0 | " |
| Resin C | | | | | | |
| Density (g/cm$^3$) | 0.88 | " | " | 0.89 | " | 0.88 |
| MI (g/10 min.) | 3.6 | " | " | 3.6 | " | 3.6 |
| Comonomer | butene-1 | " | " | butene-1 | " | butene-1 |
| Melting point (°C.) | 74 | " | " | 83.8 | " | 74 |
| Resin D | | | | | | |
| (the same as right) | Resin D of intermediate layer | Resin D of intermediate layer | Resin D of intermediate layer | Resin D of intermediate layer | Resin D of intermediate layer | Resin D of intermediate layer |
| B/C/D weight ratio | 25/50/25 | Resin D of intermediate layer | Resin D of intermediate layer | 45/40/1 | 30/55/1 | 50/50/0 |
| Setting of thickness proportion of innermost and outermost layers (%) | 15 | 12.5 | 10 | 17.5 | 10 | 10 |

TABLE 2

|  | Ex. 1 | Ex. 2 | Ex. 3 | Ex. 4 | Ex. 5 | Ex. 6 |
|---|---|---|---|---|---|---|
| Area stretching ratio (time) | 20 | 20 | 20 | 20 | 20 | 20 |
| Tensile strength S at stretching (kg/cm$^2$) | 70 | 70 | 110 | 90 | 90 | 70 |
| Multi-layer stretchable, shrinkable film | | | | | | |
| Thickness (μm) | | | | | | |
| Intermediate layer | 9.1 | 9.8 | 10.5 | 8.5 | 10.5 | 10.5 |
| Innermost layer | 2.0 | 1.6 | 1.3 | 2.3 | 1.3 | 1.3 |
| Outermost layer | 2.0 | 1.6 | 1.3 | 2.2 | 1.2 | 1.3 |
| Whole layers | 13.1 | 13.0 | 13.1 | 13.0 | 13.0 | 13.1 |
| Haze after shrinking (%) | 0.7 | 0.7 | 0.7 | 0.9 | 0.8 | 0.8 |
| Gloss after shrinking (%) | 152 | 153 | 152 | 149 | 151 | 151 |
| Modulus of tensile elasticity in the machine direction (kg/cm$^2$) | 2500 | 2600 | 2600 | 2600 | 2500 | 2400 |
| Tensile stress at 50%-elongation in the transverse direction (kg/cm$^2$) | 250 | 360 | 380 | 300 | 240 | 260 |
| Area shrinkage at 90° C. (%) | 33 | 28 | 39 | 37 | 37 | 31 |
| Elastic restoration after 15%-shrinking (%) MD/TD | 91/91 | 90/90 | 91/91 | 91/91 | 91/91 | 90/90 |
| Tuck in property | ○ | ○ | ○ | ○ | ○ | ○ |
| Heat seal initiating temperature (°C.) | 80 | 80 | 80 | 80 | 80 | 80 |
| Heat resisting temperature (°C.) | 145 | 145 | 145 | 145 | 140 | 145 |
| Stretchability | ○ | ○ | ○ | ○ | ○ | ○ |
| Restoration after packaging | ○ | ○ | ○ | ○ | ○ | ○ |
| Antifogging property A | ○ | ○ | ○ | ○ | ○ | ○ |

TABLE 3

|  | Com. Ex. 1 | Com. Ex. 2 | Com. Ex. 3 | Com. Ex. 4 |
|---|---|---|---|---|
| Intermediate layer | | | | |
| Resin A | | | | |
| Density (g/cm$^3$) | 0.920 | " | " | 0.930 |
| MI (g/10 min.) | 0.5 | " | " | " |
| Comonomer | 4-methyl-pentene-1 | " | " | " |
| Melting point (°C.) | 124 | " | " | " |
| Heat of fusion (mJ/mg) | 143 | " | " | " |

TABLE 3-continued

|  | Com. Ex. 1 | Com. Ex. 2 | Com. Ex. 3 | Com. Ex. 4 |
| --- | --- | --- | --- | --- |
| Resin D |  |  |  |  |
| Density (g/cm³) | 0.930 | 0.910 | " | " |
| MI (g/10 min.) | 1.3 | 3.0 | " | " |
| Melting point (°C.) | 125 | 115 | " | " |
| Heat of fusion (mJ/mg) | 139 | 90 | " | " |
| Resin C |  |  |  |  |
| (the same as right) | Resin C of innermost layer and outermost layer | Resin C of innermost layer and outermost layer | Resin C of innermost layer and outermost layer | Resin C of innermost layer and outermost layer |
| A/D/C weight ratio | 70/25/5 | 90/5/5 | 55/40/5 | 70/25/5 |
| Setting of thickness proportion (%) | 70 | 70 | 70 | 70 |
| Innermost and outermost layers |  |  |  |  |
| Resin B |  |  |  |  |
| Density (g/cm³) | 0.922 | " | " | " |
| MI (g/10 min.) | 3.0 | " | " | " |
| Resin C |  |  |  |  |
| Density (g/cm³) | 0.88 | " | " | " |
| MI (g/10 min.) | 3.6 | " | " | " |
| Comonomer | butene-1 | " | " | " |
| Melting point (°C.) | 74 | " | " | " |
| Resin D |  |  |  |  |
| (the same as right) | Resin D of intermediate layer | Resin D of intermediate layer | Resin D of intermediate layer | Resin D of intermediate layer |
| B/C/D weight ratio | 25/50/25 | 45/50/5 | 20/50/30 | 10/60/30 |
| Setting of thickness proportion of innermost and outermost layers (%) | 15 | 15 | 15 | 15 |

TABLE 4

|  | Com. Ex. 1 | Com. Ex. 2 | Com. Ex. 3 | Com. Ex. 4 |
| --- | --- | --- | --- | --- |
| Area stretching ratio (time) | 20 | 20 | 20 | 20 |
| Tensile strength S at stretching (kg/cm²) | 70 | 70 | 70 | 70 |
| Multi-layer stretchable, shrinkable film |  |  |  |  |
| Thickness (μm) |  |  |  |  |
| Intermediate layer | 9.1 | 9.1 | 9.1 | 9.1 |
| Innermost layer | 2.0 | 1.9 | 2.0 | 1.9 |
| Outermost layer | 2.0 | 2.0 | 1.9 | 2.0 |
| Whole layers | 13.1 | 13.0 | 13.0 | 13.0 |
| Haze after shrinking (%) | 0.7 | 0.8 | 0.7 | 1.0 |
| Gloss after shrinking (%) | 149 | 149 | 150 | 146 |
| Modulus of tensile elasticity in the machine direction (kg/cm²) | 2700 | 2700 | 2200 | 2500 |
| Tensile stress at 50%-elongation in the transverse direction (kg/cm²) | 440 | 480 | 210 | 260 |
| Area shrinkage at 90° C. (%) | 30 | 29 | 38 | 35 |
| Elastic restoration after 15%-shrinking (%) MD/TD | 90/90 | 90/90 | 91/91 | 90/91 |
| Tuck in property | O | O | X | Δ |
| Heat seal initiating temperature (°C.) | 80 | 80 | 80 | 85 |
| Heat resisting temperature (°C.) | 145 | 145 | 135 | 145 |
| Stretchability | X | X | O | O |
| Restoration after packaging | O | O | O | O |
| Antifogging property A | O | O | O | O |

TABLE 5

|  |  | Com. Ex. 5 | Com. Ex. 6 | Com. Ex. 7 |
| --- | --- | --- | --- | --- |
| Intermediate layer |  |  |  |  |
| Resin A | Density (g/cm³) | 0.920 | 0.916 | 0.900 |
|  | MI (g/10 min) | 0.5 | 1.2 | 0.4 |
|  | Comonomer | 4-methyl-pentene-1 | 4-methyl-pentene-1, butene-1 | butene-1 |
|  | Melting point (°C.) | 124 | 124 | 123 |
|  | Heat of fusion (mJ/mg) | 143 | 129 | 83 |
| Resin D | Density (g/cm³) | 0.930 | the same as resin A | the same as resin A |
|  | MI (g/10 min.) | 1.3 |  |  |
|  | Melting point (°C.) | 125 |  |  |
|  | Heat of fusion (mJ/mg) | 139 |  |  |
| Resin C | (the same as right) | Resin C of innermost layer and outermost layer | Resin C of innermost layer and outermost layer | Resin C of innermost layer and outermost layer |
|  | A/D/C weight ratio | 70/25/5 | 90/0/10 | 95/0/5 |

TABLE 5-continued

|  |  | Com. Ex. 5 | Com. Ex. 6 | Com. Ex. 7 |
|---|---|---|---|---|
| Setting of thickness proportion (%) |  | 70 | 80 | 70 |
| Innermost and outermost layers |  |  |  |  |
| Resin B | Density (g/cm³) | 0.922 | the same as resin A | the same as resin A |
|  | MI (g/10 min.) | 3.0 | as resin A | as resin A |
| Resin C | Density (g/cm³) | 0.88 | the same as resin A | the same as resin A |
|  | MI (g/10 min.) | 3.6 | the same as resin A | the same as resin A |
|  | Comonomer | butene-1 | the same as resin A | the same as resin A |
|  | Melting point (°C.) | 74 | the same as resin A | the same as resin A |
| Resin D | (the same as right) | Resin D of intermediate layer | — | — |
| B/C/D weight ratio |  | 10/60/30 | 50/50/0 | 80/20/0 |
| Setting of thickness proportion of innermost and outermost layers (%) |  | 15 | 10 | 15 |

TABLE 6

|  | Com. Ex. 5 | Com. Ex. 6 | Com. Ex. 7 |
|---|---|---|---|
| Area stretching ratio (time) | 20 | 20 | 20 |
| Tensile strength S at stretching (kg/cm²) | 150 | 70 | 70 |

TABLE 6-continued

|  |  | Com. Ex. 5 | Com. Ex. 6 | Com. Ex. 7 |
|---|---|---|---|---|
| Multi-layer stretchable, shrinkable film |  |  |  |  |
| Thickness (μm) | Intermediate layer | 9.1 | 10.5 | 9.1 |
|  | Innermost layer | 2.0 | 1.3 | 2.0 |
|  | Outermost layer | 1.9 | 1.3 | 1.9 |
|  | Whole layers | 13.0 | 13.1 | 13.1 |
| Haze after shrinking (%) |  | 0.8 | 0.8 | 0.7 |
| Gloss after shrinking (%) |  | 151 | 150 | 151 |
| Modulus of tensile elasticity in the machine direction (kg/cm²) |  | 2800 | 2400 | 1900 |
| Tensile stress at 50%-elongation in the transverse direction (kg/cm²) |  | 490 | 270 | 390 |
| Area shrinkage at 90° C. (%) |  | 40 | 34 | 25 |
| Elastic restoration after 15%-shrinking (%) MD/TD |  | 91/91 | 91/90 | 91/91 |
| Tuck in property |  | ○ | Δ | ○ |
| Heat seal initiating temperature (°C.) |  | 80 | 90 | 90 |
| Heat resisting temperature (°C.) |  | 145 | 140 | 130 |
| Stretchability |  | X | ○ | ○ |
| Restoration after packaging |  | ○ | ○ | ○ |
| Antifogging property A |  | ○ | ○ | ○ |

TABLE 7

|  | Ex. 7 | Ex. 8 | Ex. 9 | Ex. 10 | Ex. 11 |
|---|---|---|---|---|---|
| Intermediate layer |  |  |  |  |  |
| Resin A |  |  |  |  |  |
| Density (g/cm³) | 0.920 | 0.920 | 0.930 | 0.930 | 0.920 |
| MI (g/10 min.) | 0.5 | 0.5 | 1.3 | 1.3 | 0.5 |
| Comonomer | 4-methyl-pentene-1 | 4-methyl-pentene-1 | 4-methyl-pentene-1 | 4-methyl-pentene-1 | 4-methyl-pentene-1 |
| Melting point (°C.) | 124 | 124 | 125 | 125 | 124 |
| Heat of fusion (mJ/mg) | 143 | 143 | 139 | 139 | 143 |
| Resin D |  |  |  |  |  |
| Density (g/cm³) | 0.919 | 0.919 | 0.910 | 0.910 | 0.919 |
| MI (g/10 min.) | 1.0 | 1.0 | 3.0 | 3.0 | 1.0 |
| Melting point (°C.) | 121 | 121 | 115 | 115 | 121 |
| Heat of fusion (mJ/mg) | 116 | 116 | 90 | 90 | 116 |
| Resin C | the same as resin C used in innermost and outermost layers | the same as resin C used in innermost and outermost layers | the same as resin C used in innermost and outermost layers | the same as resin C used in innermost and outermost layers | the same as resin C used in innermost and outermost layers |
| A/D/C weight ratio | 70/25/5 | 70/25/5 | 75/20/5 | 75/20/5 | 70/25/5 |
| Setting of thickness proportion (%) | 75 | 75 | 65 | 65 | 75 |
| Innermost and outermost layers |  |  |  |  |  |
| Resin B |  |  |  |  |  |
| Density (g/cm³) | 0.928 | 0.928 | 0.922 | 0.922 | 0.928 |
| MI (g/10 min.) | 3.0 | 3.0 | 3.0 | 3.0 | 3.0 |
| Resin C |  |  |  |  |  |
| Density (g/cm³) | 0.88 | 0.88 | 0.89 | 0.89 | 0.88 |
| MI (g/10 min.) | 3.6 | 3.6 | 3.6 | 3.6 | 3.6 |

TABLE 7-continued

|  | Ex. 7 | Ex. 8 | Ex. 9 | Ex. 10 | Ex. 11 |
|---|---|---|---|---|---|
| Comonomer | butene-1 | butene-1 | butene-1 | butene-1 | butene-1 |
| Melting point (°C.) | 74 | 74 | 83.8 | 83.8 | 74 |
| Resin D | the same as resin D used in intermediate layer | the same as resin D used in intermediate layer | the same as resin D used in intermediate layer | the same as resin D used in intermediate layer | the same as resin D used in intermediate layer |
| B/C/D weight ratio | 25/50/25 | 25/50/25 | 45/40/15 | 45/40/15 | 25/50/25 |
| Setting of thickness proportion (%)* | 12.5 | 12.5 | 17.5 | 17.5 | 12.5 |

Note:
*Showing the setting of thickness proportion with respect to both the innermost layer and the outermost layer.

TABLE 8

|  |  | Ex. 7 | Ex. 8 | Ex. 9 | Ex. 10 | Ex. 11 |
|---|---|---|---|---|---|---|
| Area stretching ratio (time) | | 20 | 20 | 20 | 20 | 20 |
| Tensile strength S at stretching (kg/cm$^2$) | | 70 | 70 | 90 | 90 | 70 |
| Surfactant (% by weight) | | | | | | |
| (i) | Polyethylene glycol(4.5) oleate | 0.25 | 0.25 | — | — | 0.25 |
|  | Polyethylene glycol(9.5) oleate | — | — | 0.25 | — | — |
|  | Polyethylene glycol(4.5) laurate | — | — | — | 0.25 | — |
| (ii) | Polyoxyethylene(2) oleylamine | 0.40 | 0.40 | — | 0.45 | 0.20 |
|  | Polyoxyethylene(2) laurylamine | — | — | 0.45 | — | — |
| (iii) | Polyoxyethylene(5.5) oleyl ether | 0.15 | 0.15 | — | — | 0.15 |
|  | Polyoxyethylene(9.3) lauryl ether | — | — | 0.10 | — | — |
|  | Polyoxyethylene(8) oleyl ether | — | — | — | 0.25 | — |
| (iv) | Diglycerol oleate mp −12° C. | 0.20 | 0.20 | 0.65 | 1.50 | 0.40 |
|  | Diglycerol beef tallow fatty acid ester mp 35° C. | 0.15 | 0.15 | — | — | 0.15 |
|  | Diglycerol stearate mp 60° C. | — | — | 0.10 | 0.30 | — |
| (i):(ii):(iii):(iv) | | 1.7:2.6:1:2.3 | 1.7:2.6:1:2.3 | 2.5:4.5:1:7.5 | 1:1.8:1:7.2 | 1.7:1.3:1:3.7 |
| Amount of surfactant composition (% by weight) | | | | | | |
| Inner layer | | 1.15 | 0.5 | 1.55 | 2.75 | 1.15 |
| Intermediate layer | | 1.15 | 1.15 | 1.55 | 2.75 | 1.15. |
| Outer layer | | 1.15 | 0.5 | 1.55 | 2.75 | 1.15 |

Note:
Figures in the parentheses of the surfactant components indicate the number of moles of added ethylene glycol or ethylene oxide.

TABLE 9

|  |  | Ex. 7 | Ex. 8 | Ex. 9 | Ex. 10 | Ex. 11 |
|---|---|---|---|---|---|---|
| Automatic packaging machine applicability | | ○ | ○ | ○ | ○ | ○ |
| Haze after shrinking % | | 0.6 | 0.8 | 0.7 | 0.7 | 0.8 |
| Gloss after shrinking % | | 152 | 150 | 151 | 152 | 148 |
| Antifogging property B | | | | | | |
| Pork ribs | after 1 hour | ○ | ○ | ○ | ○ | ○ |
|  | after 4 hours | ○ | ○ | ○ | ○ | ○ |
|  | after 8 hours | ○ | ○ | ○ | ○ | ○ |
|  | after 1 day | ○ | ○ | ○ | ○ | ○ |
|  | after 2 days | ○ | ○ | ○ | ○ | ○ |
|  | after 3 days | ○ | ○ | ○ | ○ | ○ |
| Beef ribs | after 1 hour | ○ | ○ | ○ | ○ | ○ |
|  | after 4 hours | ○ | ○ | ○ | ○ | ○ |
|  | after 8 hours | ○ | ○ | ○ | ○ | ○ |
|  | after 1 day | ○ | ○ | ○ | ○ | ○ |
|  | after 2 days | ○ | ○ | ○ | ○ | ○ |
|  | after 3 days | ○ | ○ | ○ | ○ | ○ |
| Ginger | after 1 hour | ◉ | ◉ | ◉ | ◉ | ○ |
|  | after 4 hours | ◉ | ◉ | ◉ | ◉ | ○ |
|  | after 8 hours | ◉ | ◉ | ◉ | ◉ | ◉ |
|  | after 1 day | ◉ | ◉ | ◉ | ◉ | ◉ |
|  | after 2 days | ○ | ○ | ○ | ○ | ○ |
|  | after 3 days | ○ | ○ | ○ | ○ | ○ |
|  | after 4 days | ○ | ○ | ○ | ○ | ○ |
|  | after 6 days | ○ | ○ | ○ | ○ | ○ |
|  | after 10 days | ○ | ○ | ○ | ○ | ○ |
|  | after 14 days | ○ | ○ | ○ | ○ | ○ |
| Champignon | after 1 hour | ◉ | ◉ | ◉ | ◉ | ○ |
|  | after 4 hours | ◉ | ◉ | ◉ | ◉ | ○ |
|  | after 8 hours | ◉ | ◉ | ◉ | ◉ | ◉ |
|  | after 1 day | ◉ | ◉ | ◉ | ◉ | ◉ |
|  | after 2 days | ○ | ○ | ○ | ○ | ○ |
|  | after 3 days | ○ | ○ | ○ | ○ | ○ |
|  | after 4 days | ○ | ○ | ○ | ○ | ○ |
|  | after 6 days | ○ | ○ | ○ | ○ | ○ |
|  | after 10 days | ○ | ○ | ○ | ○ | ○ |
|  | after 14 days | ○ | ○ | ○ | ○ | ○ |

TABLE 10

|  |  | Com. Ex. 8 | Com. Ex. 9 |
|---|---|---|---|
| Intermediate layer | | | |
| Resin A | Density (g/cm³) | 0.920 | 0.920 |
| | MI (g/10 min.) | 0.5 | 0.5 |
| | Comonomer | 4-methyl-pentene-1 | 4-methyl-pentene-1 |
| | Melting point (°C.) | 124 | 124 |
| | Heat of fusion (mJ/mg) | 143 | 143 |
| Resin D | Density (g/cm³) | 0.919 | 0.919 |
| | MI (g/10 min.) | 1.0 | 1.0 |
| | Melting point (°C.) | 121 | 121 |
| | Heat of fusion (mJ/mg) | 116 | 116 |
| Resin C | | the same as Resin C of innermost layer and outermost layer | |
| A/D/C weight ratio | | 70/25/5 | 70/25/5 |
| Setting of thickness proportion (%) | | 75 | 75 |
| Innermost and outermost layers | | | |
| Resin B | Density (g/cm³) | 0.928 | 0.928 |
| | MI (g/10 min) | 3.0 | 3.0 |
| Resin C | Density (g/cm³) | 0.88 | 0.88 |
| | MI (g/10 min.) | 3.6 | 3.6 |
| | Comonomer | butene-1 | butene-1 |
| | Melting point (°C.) | 74 | 74 |
| Resin D | | the same as Resin D of intermediate layer | |
| B/C/D weight ratio | | 25/50/25 | 25/50/25 |
| Setting of thickness proportion (%)* | | 12.5 | 12.5 |

Note:
*Showing the setting of thickness proportion with respect to both the innermost layer and the outermost layer.

TABLE 11

|  |  | Com. Ex. 8 | Com. Ex. 9 |
|---|---|---|---|
| Area stretching ratio (time) | | 20 | 20 |
| Tensile strength S at stretching (kg/cm²) | | 70 | 70 |
| Surfactant (% by weight) | | | |
| (i) | Polyethylene glycol(4.5) oleate | 0.25 | — |
| | Polyethylene glycol(4.5) laurate | — | 0.25 |
| (ii) | Polyoxyethylene(2) oleylamine | 0.40 | — |
| | Polyoxyethylene(2) laurylamine | — | 0.40 |
| (iii) | Polyoxyethylene(5.5) oleyl ether | — | 0.15 |
| (iv) | Diglycerol oleate mp −12° C. | 0.35 | 0.35 |
| | Diglycerol beef tallow fatty acid ester mp 35° C. | 0.15 | — |
| (Others) | | | |
| Sorbitan laurate | | — | — |
| Glycerol monooleate | | — | — |
| (i):(ii):(iii):(iv) | | — | 1.7:3:1:2.3 |
| Amount of surfactant composition (% by weight) | | | |
| Inner layer | | 1.15 | 1.2 |
| Intermediate layer | | 1.15 | 1.2 |
| Outer layer | | 1.15 | 1.2 |

Note:
Figures in the parentheses of the surfactant components indicate the number of moles of added ethylene glycol or ethylene oxide

TABLE 12

|  |  | Com. Ex. 8 | Com. Ex. 9 |
|---|---|---|---|
| Automatic packaging machine applicability | | ○ | ○ |
| Haze after shrinking % | | 0.7 | 0.6 |
| Gloss after shrinking % | | 152 | 154 |
| Antifogging property B | | | |
| Pork ribs | after 1 hour | Δ | ○ |
| | after 4 hours | X | ○ |
| | after 8 hours | X | ○ |
| | after 1 day | Δ | ○ |
| | after 2 days | Δ | ○ |
| | after 3 days | ○ | Δ |
| Beef ribs | after 1 hour | Δ | ○ |
| | after 4 hours | X | ○ |
| | after 8 hours | X | ○ |
| | after 1 day | Δ | ○ |
| | after 2 days | Δ | ○ |
| | after 3 days | ○ | Δ |
| Ginger | after 1 hour | ⊙ | ⊙ |
| | after 4 hours | ⊙ | ⊙ |
| | after 8 hours | ⊙ | ⊙ |
| | after 1 day | ○ | ○ |
| | after 2 days | ○ | ○ |
| | after 3 days | ○ | Δ |
| | after 4 days | ○ | Δ |
| | after 6 days | ○ | X |
| | after 10 days | ○ | X |
| | after 14 days | ○ | X |
| Champignon | after 1 hour | ⊙ | ⊙ |
| | after 4 hours | ⊙ | ⊙ |
| | after 8 hours | ⊙ | ⊙ |
| | after 1 day | ○ | ○ |
| | after 2 days | ○ | ○ |
| | after 3 days | ○ | ○ |
| | after 4 days | ○ | Δ |
| | after 6 days | ○ | X |
| | after 10 days | ○ | X |
| | after 14 days | ○ | X |

We claim:

1. A multi-layer stretchable, shrinkable polyethylene film comprising at least three layers, an intermediate layer an innermost layer located on one side of the intermediate layer, and an outermost layer located on an opposite side of the intermediate layer, the intermediate layer made of a composition containing, as main components, (A) a linear low density polyethylene mentioned below and (D) a linear low density polyethylene mentioned below, the innermost layer and the outermost layer made of a composition containing, as main components (B) 15 to 50% by weight of a high pressure process polyethylene mentioned below, (C) 60 to 20% by weight of an ethylene-α-olefin copolymer mentioned below and (D) a linear low density polyethylene mentioned below, wherein the maximum amount of the linear low density polyethylene (D) contained in each of the layers is 30% by weight, the total amount of the linear low density polyethylene (D) contained in the three layers is from 10 to 30% by weight based on the three layers, and the thickness of the intermediate layer is at least 60% of the total thickness of the three layers and the thickness of each of the innermost layer and the outermost layer is at least 1 μm, and wherein:

(A) the linear low density polyethylene has a density of 0.915 to 0.935 g/cm³ and a melt index (MI) of 0.1 to 1.5 g/10 minutes, and shows, in measurement of a melting point by a differential scanning calorimeter (DSC), a main peak temperature within the range of not less than 121° C. and a heat of fusion within the range of 120 to 150 mJ/mg in a fusion curve obtained when the temperature is kept at 190° C. for 30 minutes, dropped down to 20° C. at a temperature dropping rate of 10° C./minute and subsequently raised at a temperature rising rate of 10° C./minute;

(B) the high pressure process polyethylene has a density of 0.917 to 0.935 g/cm³ and an MI of 0.3 to 7.0 g/10 minutes;

(C) the ethylene-α-olefin copolymer has a density of 0.870 to 0.900 g/cm³ and an MI of 0.1 to 20 g/10 minutes and shows, in measurement of a melting point by DSC, a main peak temperature of 50° to 100° C. in a fusion curve obtained when the temperature is kept at 190° C. for 30 minutes, dropped down to 20° C. at a temperature dropping rate of 10° C./minute and subsequently raised at a temperature rising rate of 10° C./minute; and (D) the linear low density polyethylene has a density of 0.890 to 0.920 g/cm³ and an MI of 0.3 to 7.0 g/10 minutes, and shows, in measurement of a melting point by DSC, a main peak temperature of not less than 112° C. and a heat of fusion of 75 to 130 mJ/mg in a fusion curve obtained when the temperature is kept at 190° C. for 30 minutes, dropped down to 20° C. at a temperature dropping rate of 10° C./minute and subsequently raised at a temperature rising rate of 10° C./minute.

2. The multi-layer stretchable, shrinkable polyethylene film of claim 1, wherein the linear low density polyethylene (A) is a copolymer of ethylene and at least one α-olefin selected from the group consisting of butene-1, pentene-1, hexene-1, octene-1 and 4-methyl-pentene-1.

3. The multi-layer stretchable, shrinkable polyethylene film of claim 1 or 2, which has a tensile stress at 50% elongation in the transverse direction of not more than 400 kg/cm².

4. The multi-layer stretchable, shrinkable polyethylene film of claim 1 or 2 which has an area shrinkage of not less than 20% at 90° C.

5. The multi-layer stretchable, shrinkable polyethylene film of claim 1 or 2, wherein the elastic restorations of the film, after being heat-shrinked in an area shrinkage of 15% at 90° C. when determined 1 minute after 30% elongation in both the machine and transverse directions of the film, are not less than 90%, respectively.

6. The multi-layer stretchable, shrinkable polyethylene film of any of claim 1 or 2, wherein a specific surfactant composition comprising the following surfactants (i), (ii), (iii) and (iv) is added to at least two layers in an amount of 0.5 to 4.0% by weight, said surfactants being:

(i) one or more polyethylene glycol fatty acid esters, (ii) one or more polyoxyethylene alkyl amines, (iii) one or more polyoxyethylene alkyl ethers, and (iv) one or more diglycerol fatty acid esters wherein at least one ester has a melting point of not less than 25° C.

7. The multi-layer stretchable, shrinkable polyethylene film of claim 6, wherein the ratio of (i):(ii):(iii):(iv) in the surfactant composition comprising (i), (ii), (iii) and (iv) is (i) 1 to 5; (ii) 1.5 to 8; (iii) 1; (iv) 1 to 10.

8. A process for the preparation of a multi-layer stretchable, shrinkable polyethylene film comprising at least three layers, an intermediate layer, an innermost layer located on one side of the intermediate layer; and an outermost layer located on an opposite side of the intermediate layer, the method comprising carrying out melt-coextrusion to form the intermediate layer made of a composition containing, as main components, (A) a linear low density polyethylene mentioned below and (D) a linear low density polyethylene mentioned below, and to form the innermost and outermost layers made of a composition containing, as main components, (B) 15 to 50% by weight of a high pressure process polyethylene mentioned below, (C) 60 to 20% by weight of an ethylene-α-olefin copolymer mentioned below and (D) a linear low density polyethylene mentioned below, wherein the maximum amount of the linear low density polyethylene (D) contained in each layer is 30% by weight and the amount of the linear low density polyethylene (D) contained in the three layers is 10 to 30% by weight based on the three layers, so that the thickness of the intermediate layer is at least 60% of the total thickness of the whole layers, and the thickness of each of the innermost layer and the outermost layer is at least 1 μm after the stretching in a succeeding step, solidifying by rapid cooling to give a non-stretched film, and stretching the non-stretched film in a temperature region capable of inducing orientation by stretching under conditions such that a tensile strength S shown below by the equation (1) is $40 \leq S \leq 130$ kg/cm², wherein:

(A) the linear low density polyethylene has a density of 0.915 to 0.935 g/cm³ and a melt index (MI) of 0.1 to 1.5 g/10 minutes, and shows, in measurement of a melting point by a differential scanning calorimeter (DSC), a main peak temperature within the range of not less than 121° C. and a heat of fusion within the range of 120 to 150 mJ/mg in a fusion curve obtained when the temperature is kept at 190° C. for 30 minutes, dropped down to 20° C. at a temperature dropping rate of 10° C./minutes and subsequently raised at a temperature rising rate of 10° C./minute;

(B) the high pressure process polyethylene has a density of 0.917 to 0.935 g/cm³ and an MI of 0.3 to 7.0 g/10 minutes;

(C) the ethylene-α-olefin copolymer has a density of 0.870 to 0.900 g/cm³, and an MI of 0.1 to 20 g/10 minutes and shows, in measurement of a melting point by DSC, a main peak temperature of 50° to 100° C. in a fusion curve obtained when the temperature is kept at 190° C. for 30 minutes, dropped down to 20° C. at a temperature dropping rate of 10° C./minute and subsequently raised at a temperature rising rate of 10° C./minute;

(D) the linear low density polyethylene has a density of 0.890 to 0.920 g/cm³ and an MI of 0.3 to 7.0 g/10 minutes, and shows, in measurement of a melting point by DSC, a main peak temperature of not less than 112° C. and a heat of fusion of 75 to 130 mJ/mg in a fusion curve obtained when the temperature is kept at 190° C. for 30 minutes, dropped down to 20° C. at a temperature dropping rate of 10° C./minute and subsequently raised at a temperature rising rate of 10° C./minute; and the equation (1) is:

$$S = pd/2t \qquad (1)$$

wherein p is an internal pressure of a bubble (kg/cm²), d is a diameter of the bubble (cm) and t is a film thickness (cm).

9. The process of claim 8, wherein a specific surfactant composition comprising the following surfactants (i), (ii), (iii) and (iv) is added to at least two layers in an amount of 0.5 to 4.0% by weight, said surfactants being:

(i) one or more polyethylene glycol fatty acid esters, (ii) one or more polyoxyethylene alkyl amines, (iii) one or more polyoxyethylene alkyl ethers, and (iv) one or more diglycerol fatty acid esters wherein at least one ester has a melting point of less then 25° C.

* * * * *